United States Patent
Carls

[19]

[11] Patent Number: 6,126,374
[45] Date of Patent: Oct. 3, 2000

[54] BALE LOADING ARM DEVICE

[76] Inventor: Calvin Carls, 12670 120th Ave. NW., Pennock, Minn. 56279

[21] Appl. No.: 09/079,752

[22] Filed: May 15, 1998

[51] Int. Cl.[7] .................................................. A01D 87/12
[52] U.S. Cl. .......................................... 414/111; 414/555
[58] Field of Search .................................... 414/24.5, 111, 414/546, 549, 555

[56] References Cited

U.S. PATENT DOCUMENTS

| | | | |
|---|---|---|---|
| 4,363,583 | 12/1982 | Bontrager | 414/555 |
| 4,368,000 | 1/1983 | Naaktgeboren et al. | |
| 4,459,075 | 7/1984 | Eichenberger | 414/555 |
| 4,552,501 | 11/1985 | Clark et al. | 414/555 |
| 4,778,330 | 10/1988 | Mailleux et al. | |
| 4,909,694 | 3/1990 | Peters et al. | 414/111 |
| 4,911,491 | 3/1990 | Naaktgeboren | |
| 4,952,111 | 8/1990 | Callahan | |
| 4,961,679 | 10/1990 | Van Eecke et al. | |
| 5,288,193 | 2/1994 | Warburton et al. | 414/111 |
| 5,507,612 | 4/1996 | Siebenga | |
| 5,607,274 | 3/1997 | Cook | |
| 5,647,716 | 7/1997 | Tilley | |
| 5,788,450 | 8/1998 | Willis | 414/555 |
| 5,846,046 | 12/1998 | Warburton | 414/111 |

Primary Examiner—Gregory A. Morse
Attorney, Agent, or Firm—Tipton L. Randall

[57] ABSTRACT

The invention is a bale loading arm that is used in combination with a tilt bed wagon or truck. The arm is mounted in front of the wagon bed on the wagon tongue. A bottom boom lift assembly, attached to the base frame on the tongue, pivots vertically by means of a hydraulic cylinder. An L-shaped rotating lift arm assembly is attached to the top of the boom lift, and pivots horizontally by means of a worm drive gearbox at the top of the boom lift. The lift arm extends perpendicularly away from the boom lift, and by means of another hydraulic cylinder, enables the bale lift assembly to reversibly engage bales. The bale arm assembly boom lift pivots down to engage a bale with the clamp assembly, then pivots up to elevate the bale. The lift arm assembly then rotates the bale over the wagon bed and deposits the bale on the bed or atop other bales on the bed. The combined pivoting and rotating of the two assemblies allow the operator a high degree of control in stacking the bales on the wagon bed. Once a stack of bales is formed, the tilt bed is elevated and the stack slides to the rear of the wagon. An additional stack of bales can then be place on the bed by means of the bale loading arm assembly.

19 Claims, 6 Drawing Sheets

BALE LOADING ARM DEVICE

FIELD OF THE INVENTION

The invention is a device for loading bales onto a transport device and, more particularly, to such a device in combination with a tilt-bed transport device.

BACKGROUND OF THE INVENTION

The loading of bales of forage onto vehicles such as wagons or trucks is a common task encountered in agriculture. This task can be accomplished by one or more individuals where the bales are of moderate size, with weights ranging up to about 50 pounds. For larger bales, which have become common in modern agriculture, the loading and unloading of the bales onto vehicles for transport presents a task requiring mechanical devices.

A number of innovations have been developed relating to devices for loading hay bales and the like onto transport vehicles. The following U.S. patents are representative of some of those innovations.

Naaktgeboren, in U.S. Pat. Nos. 4,368,000 and 4,911,491, discloses a bale wagon with elevator apparatus and an apparatus for picking up multiple bales simultaneously.

Mailleaux et al., in U.S. Pat. No. 4,778,330, show a hydraulic device for lifting items that is mounted to a tractor loader.

Van Eecke et al., in U.S. Pat. No. 4,961,679, disclose a bale accumulator with a bale turning mechanism.

In U.S. Pat. No. 5,507,612, Siebenga shows a tilt bed trailer with a hydraulic pick-up device to load large bales.

Front-end bale loaders are disclosed by Callahan in U.S. Pat. No. 4,952,111 and by Tilley in U.S. Pat. No. 5,647,716. Both use hydraulic arms to transfer bales to a vehicle bed.

U.S. Pat. No. 5,607,274 by Cook shows a rotating boom mounted on a flat bed truck that picks up bales adjacent the truck bed and stacks them vertically on the bed. A push bar moves the stacked bales toward the rear of the bed. Once the bale is elevated, rotated, and positioned above the bed, it can only be lowered vertically toward the bed.

Thus, there exists an unmet need for a bale loading device that is capable of transferring large bales to a flat bed vehicle such as a wagon or truck for transport. The need also exists for a device that can stack bales one atop another, providing maximum use of the carrying area of such a transport vehicle. Likewise, the device should be operable by a single individual to maximize the economical benefits of the device.

SUMMARY OF THE INVENTION

The invention is a bale loading arm assembly for transferring a bale to a bale accumulating transport platform. The assembly comprises a boom lift assembly mounted forward of the transport platform, with the boom assembly having a boom member rotatable about a horizontal axis. An L-shaped rotating lift arm assembly is rotatably attached by one leg member to the boom member which is parallel to the leg member. Another leg member of the arm assembly is oriented perpendicular to the boom member and extends rearward adjacent to the transport platform. An adjustable bale clamp assembly adapted to reversibly engage a bale is operatively attached to the leg of the lift arm assembly extending rearward adjacent to the transport platform. In operation, the transport platform is positioned adjacent to a bale. The boom lift assembly and L-shaped lift arm assembly cooperatively rotate away from the transport platform to position the bale clamp assembly to engage a bale. The clamp assembly engages the bale, then the boom lift assembly and L-shaped lift arm assembly cooperatively rotate toward the transport platform to position the bale clamp assembly and engaged bale at a selected position on the transport platform. The bale clamp assembly then releases the positioned bale.

DESCRIPTION OF THE PREFERRED EMBODIMENTS

Nomenclature

10 Bale Loading Arm Assembly
20 Boom Lift Assembly
22 Base Frame Member
24 Anchor Section of Frame Member
26 Rigid Arm Section of Frame Member
28 Boom Member
30 First End of Boom Member
32 Second End of Boom Member
34 First Boom Leg Member
36 Second Boom Leg Member
38 Connecting Shaft Member
40 First Hydraulic Cylinder Member
42 Hydraulic Hose Lines
44 L-Shaped Rotating Lift Arm Assembly
46 First Leg Member of Arm Assembly
48 Second Leg Member of Arm Assembly
50 Right Angle Apex of Arm Assembly
52 First Leg Member Opposite End
54 Outer Portion of Second Leg Member
56 Inner Portion of Second Leg Member
58 Second Leg Member Opposite End
60 Diagonal Brace Member
70 Worm Drive Gear Box Coupler Assembly
80 Bale Clamp Assembly
82 Bracket Members of Clamp Assembly
84 Second Hydraulic Cylinder Member
86 Bale Engaging Tine Members
88 Tine Member Connectors
B Bale
T Tongue of Transport Device
P Platform of Transport Device
S Side Boards of Transport Device
W Tilt Bed Wagon Member C Wheeled Chassis of Wagon Member
H Hydraulic Cylinder of Wagon Member Construction The bale loading assembly 10 is shown in the accompanying FIGS. 1–6. The bale loading assembly 10 is used in conjunction with a transport platform P, which is used to accumulate and transport bales B of material from one location to another. The transport platform P is preferably a flat bed wagon pulled by a suitable vehicle such as a tractor or the like. The bale loading assembly 10 is mounted forward of the transport platform P on the tongue T of the wagon that connects the wagon to the tractor. Alternatively, the transport platform P may be a flat bed truck with the bale loading assembly 10 mounted on the truck frame directly behind the passenger cab of the truck and forward of the transport platform P.

Figure 1:
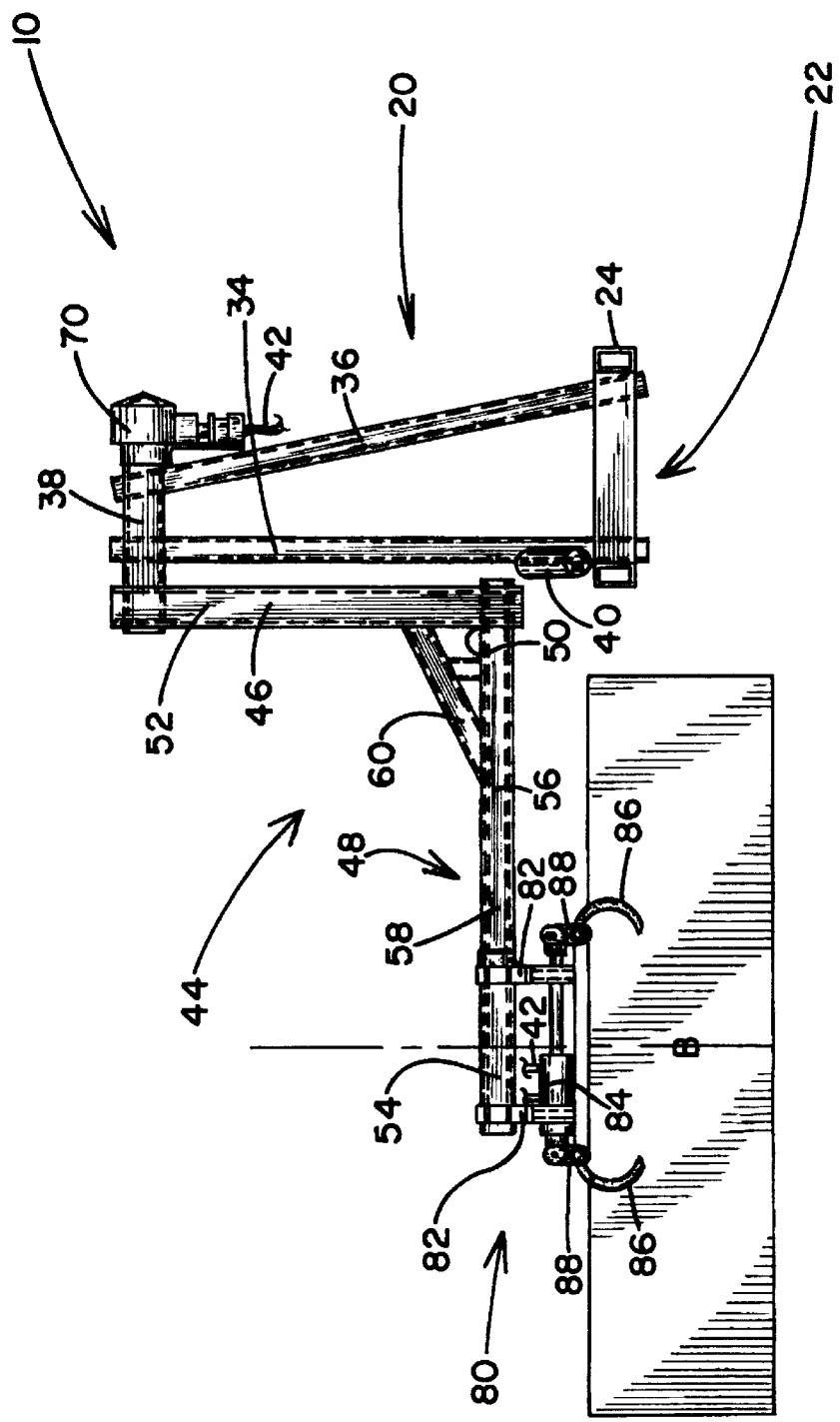
FIG. 1 is a side view of the bale loading arm assembly of the present invention.
Figure 2:
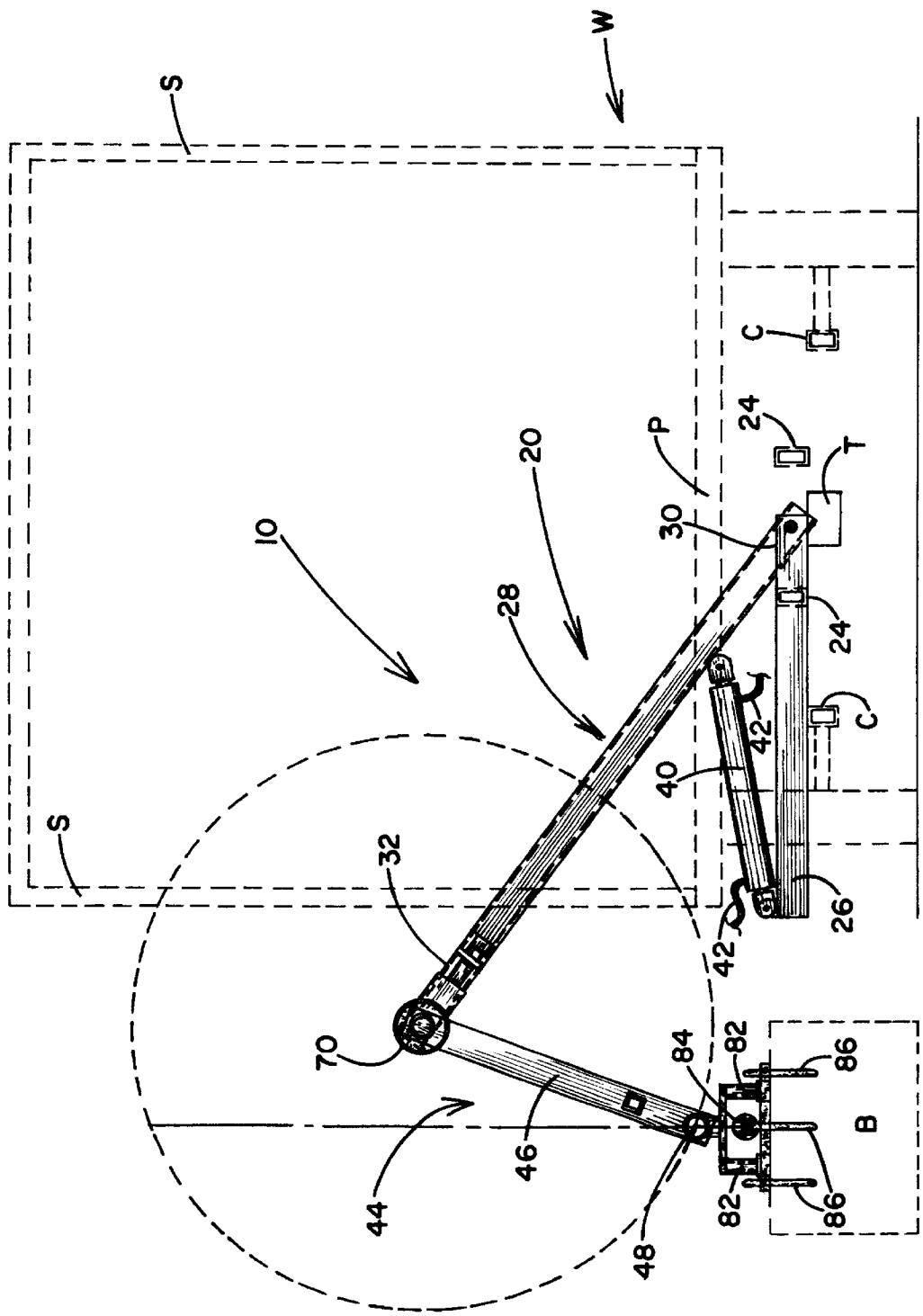
FIG. 2 is a front view of the bale loading arm assembly attached to a flat bed wagon.
Figure 3:
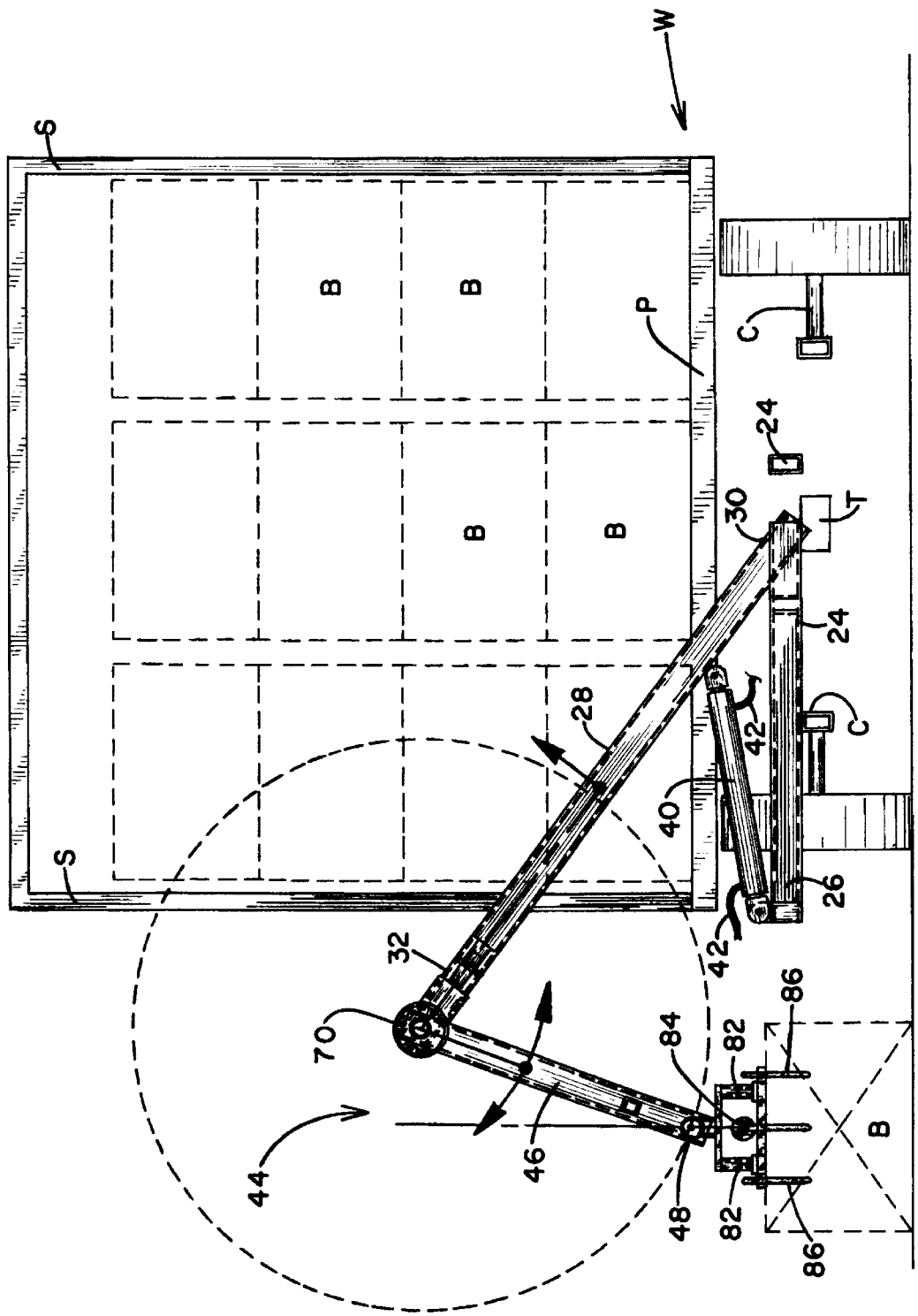
FIG. 3 is also a front view of the bale loading arm assembly attached to a flat bed wagon.

Referring to FIGS. 1 and 2, the bale loading assembly 10 includes a boom lift assembly 20 made up of a base frame member 22 secured to the tongue T of the transport platform P. The base frame member 22 includes a rectangular anchor section 24 and a rigid arm section 26 extending generally perpendicular to the anchor section 24. A boom member 28 with first 30 and second 32 ends is rotatably secured at the first end 30 to the anchor section 24 of the base frame member 22, such that the boom member 28 can rotate about a horizontal axis. The boom lift assembly 20 includes first 34 and second 36 boom leg members. A connecting shaft member 38 fastens the leg member 34, 36 at the second end 32 of the boom member 28. The leg members 34, 36 are of approximately equal length with the leg members separated a greater distance at the anchor section 24 than at the connecting shaft member 38. The arrangement of the leg members 34, 36 produces a rigid triangular structure for the boom member 28. A means for rotating the boom member 28 relative to the base frame member 22 is provided. The rotating means is a first hydraulic cylinder member 40 fastened at one end to the rigid arm section 26 of the frame member 22 furthest from the anchor section 24. The opposite end of the cylinder member 40 is fastened a selected distance up one leg member of the boom member 28. The cylinder member 40 is powered by hydraulic fluid from the tractor, which is delivered to the cylinder member 40 by hydraulic hose lines 42. The hydraulic hose lines 42 are not included in their entirety in the drawings for purposes of clarity. The hydraulic cylinder member 40 is sized such that in the fully retracted condition, the boom member 28 is oriented at about 45 degrees from vertical, and with the cylinder member 40 in the fully extended condition, the boom member 28 is oriented essentially vertically. Thus, the second end 32 of the boom member 28 moves in an arc relative to the first end 30, which is rotatably attached to the anchor section 24 of the base frame member 22, as the cylinder member 40 extends and contracts, as depicted in FIG. 3.

An L-shaped rotating lift arm assembly 44 includes first 46 and second 48 leg members attached at a right angle apex 50. The first leg member 46 is attached at an end 52 opposite the apex 50 to the connecting shaft member 38 of the boom member 28, with the first leg member oriented parallel to the boom member 28. The second leg member 48 is comprised of an inner leg section 54 and an outer leg section 56, with a portion of the inner leg section 54 extending from the outer leg section 56 opposite end 58 away from the right angle apex 50 of the lift arm assembly 44. The inner leg section 54 does not move linearly relative to the outer leg section 56. However, the inner leg section 54 is free to rotate relative to the outer leg section 56. The inner leg section 54 includes means for positioning the smaller section 54 within the larger outer leg section 56. The means for maintaining the position of the concentric leg members may be clamps secured to the inner leg portion 54 that extend beyond the outer leg portion 56. Both the inner 54 and outer leg 56 sections are circular in cross section, allowing for easy rotation of the concentric leg portions. The second leg member 48 is oriented perpendicular to the boom member 28 and extends rearward adjacent the transport platform P. A diagonal brace member 60 connects the first and second leg members 46, 48 near the apex 50 for additional strength and support. The brace member 60 is secured to the outer leg section 56 of the second leg member 48, holding the outer leg portion 56 in a constant orientation.

The connecting shaft member 38 is rotatably connected to the second end 32 of the boom member 28 and rigidly connected to the opposite end 52 of the first leg member 46 of the lift arm assembly 44. A worm drive gear box coupler assembly 70 is fastened to the connecting shaft member 38 to rotate the connecting shaft member 38 and attached lift arm assembly 44 relative to the second end 32 of the boom member 28. The coupler assembly 70 is fastened to the connecting shaft member 38 at the shaft member end opposite the first leg member 46 connection. The coupler assembly 70 is anchored to one of the boom leg members. The coupler assembly 70 is powered by an orbital hydraulic motor, well known for use in agricultural implements. To rotate the L-shaped rotating lift arm assembly 44, a worm gear attached to an orbital hydraulic motor within the coupler assembly drives a larger gear secured around the connecting shaft member 38. The worm gear is hydraulically driven and can drive the larger gear and attached connecting shaft member 38 clockwise or counterclockwise, thus rotating the L-shaped rotating lift arm assembly 44 in a similar clockwise or counterclockwise direction. Thus, the lift arm assembly 44 and connecting shaft member 38 are capable of rotating in a 360 degree arc, as depicted in FIG. 3.

A bale clamp assembly 80 is located at the opposite end 58 of the second leg member 48 of the lift arm assembly 44. The inner leg portion 56 of the second leg member 48 extends from the outer portion 54 and there beyond. A pair of bracket members 82 are secured in spaced relationship to the inner leg portion 56 of the second leg member 48 that extends beyond the outer leg portion 54. A second hydraulic cylinder member 84 is connected between the two bracket members 82. Bale engaging tine members 86 are secured to each bracket member 82 for grasping a bale. Thus, by moving the hydraulic cylinder member 84 from a fully retracted to a fully extended condition, a bale can be secured by the tine members 86. The second cylinder member 84 likewise has hydraulic hose lines connected thereto for powering the cylinder member.

The operation of the bale loading arm assembly 10 is described for the embodiment of the invention with the bale loading arm assembly 10 secured to the tongue T of a tilt bed wagon fitted with suitable side boards S for retaining the bales B. The wagon is pulled by a tractor which supplies the hydraulic power to operate both the bale loading arm assembly and the tilt bed wagon.

The wagon platform P is positioned adjacent to a bale B with the bale close to the front portion of the wagon platform. The boom lift assembly 20, secured to the anchor section 24 of the base frame member 22 positioned on the wagon tongue T, rotates from near vertical to about 30 to 40 degrees from vertical, as shown in FIG. 3. The rotation is accomplished by means of the first hydraulic cylinder member 40 retracting to an incomplete degree. This rotation moves the second end 32 of the boom assembly 20, and the rotating lift arm assembly 44 attached thereto, beyond the edge of the wagon platform P. The lift arm assembly 44 then rotates about the boom member second 32, by means of the worm drive gear box coupler assembly 70, to position the bale clamp assembly 80 over the bale B. The free rotation of the inner leg portion 56 within the outer leg portion 54 allows the bale clamp assembly 80 to hang vertically from the inner leg portion 56. The boom lift assembly 20 then lowers the positioned bale clamp assembly 80 into contact with the bale B as seen in FIG. 3. The combined movements of the boom lift assembly 20 and the rotating lift arm assembly 44 provide the operator with a high degree of control in positioning the bale clamp assembly 80 on the bale B.

Prior to contacting the bale B, the second hydraulic cylinder member 84 of the bale clamp assembly 80 moves to a fully extended position. The bale engaging tine members 86 are linked through connectors 88 to the ends of the second hydraulic cylinder member 84 such that the tine members extend horizontally with the second hydraulic cylinder member 84 in the fully extended position. Once the bale clamp assembly 80 is positioned atop the bale B, the second hydraulic cylinder member 84 contracts, causing the tine members 86 to move to a vertical orientation, thus grasping the bale B, as seen in FIG. 1.

Figure 4:
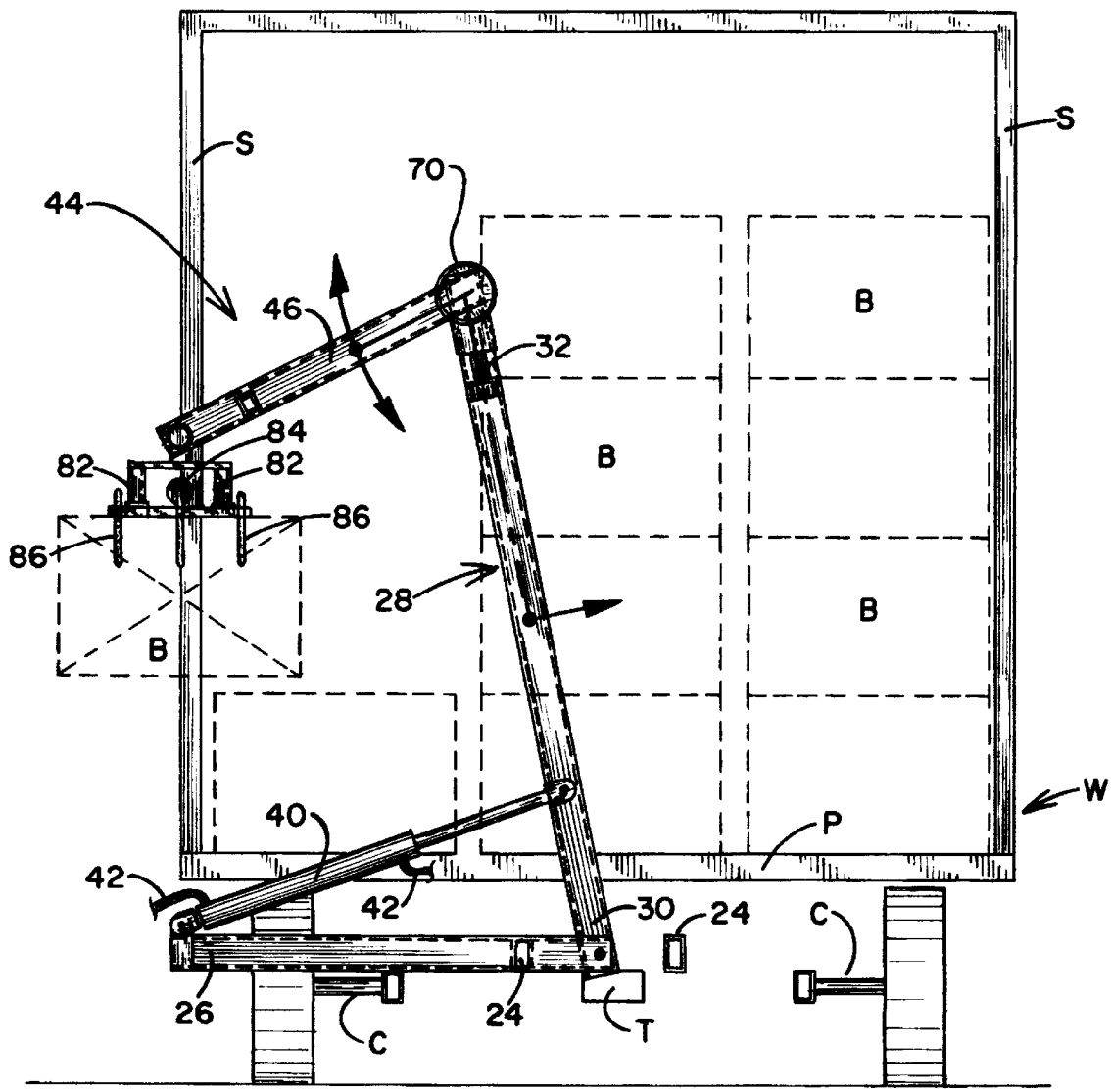
FIG. 4 is a front view of the bale loading arm assembly stacking a bale on the wagon bed.

When the bale B is firmly secured by the bale clamp assembly 80, the first hydraulic cylinder member 40 of the boom lift assembly 20 is extended, pivoting the second end 32 of the boom member upwardly and, thereby elevating the bale B above the trailer platform P as shown in FIG. 4. The free rotation of the inner leg portion 56 within the outer leg portion 54 allows the bale clamp assembly 80 and attached bale B to hang vertically from the inner leg portion 56, as seen in FIG. 4. The side boards S on the trailer platform P are constructed so the side boards are absent both at the front and a portion of the front side corner of the platform P where the bale B, bale clamp assembly 80 and L-shaped lift arm assembly 44 traverse the platform P. Next, the rotating lift arm assembly 44 rotates about the elevated second end 32 of the boom assembly by means of the worm drive gear box coupler assembly 70. The bale clamp assembly 80 at the end of the second leg member 48 of the lift arm assembly 44 and the secured bale B move in an arc to a position over the trailer platform P as shown in FIG. 4. The bale is positioned on the platform, or atop other bales already on the platform, by reversing the rotational movement of the rotating lift arm assembly 44. Again, the combined movements of the boom lift assembly 20 and the rotating lift arm assembly 44 provide the operator with a high degree of control in positioning the bale clamp assembly 80 and the attached bale B on the transport platform P. The free rotation of the inner leg portion 56 within the outer leg portion 54 allows the bale clamp assembly 80 and attached bale B to hang vertically from the inner leg portion 56, for easy stacking of bales B on the transport platform P. Once the bale B is positioned, the second hydraulic cylinder member 84 extends fully, causing the bale engaging tine member 86 to move to a horizontal orientation, thereby releasing the positioned bale B.

The above described sequence is repeated until a stack of bales is produced near the front of the platform P of the tilt bed trailer. The operator then elevates the front of the tilt bed trailer, using a hydraulic cylinder between the trailer chassis and the transport platform P, thereby causing the stack of bales to slide to the rear of the trailer bed, making room for an additional stack of bales at the front of the wagon bed.

Figure 5:
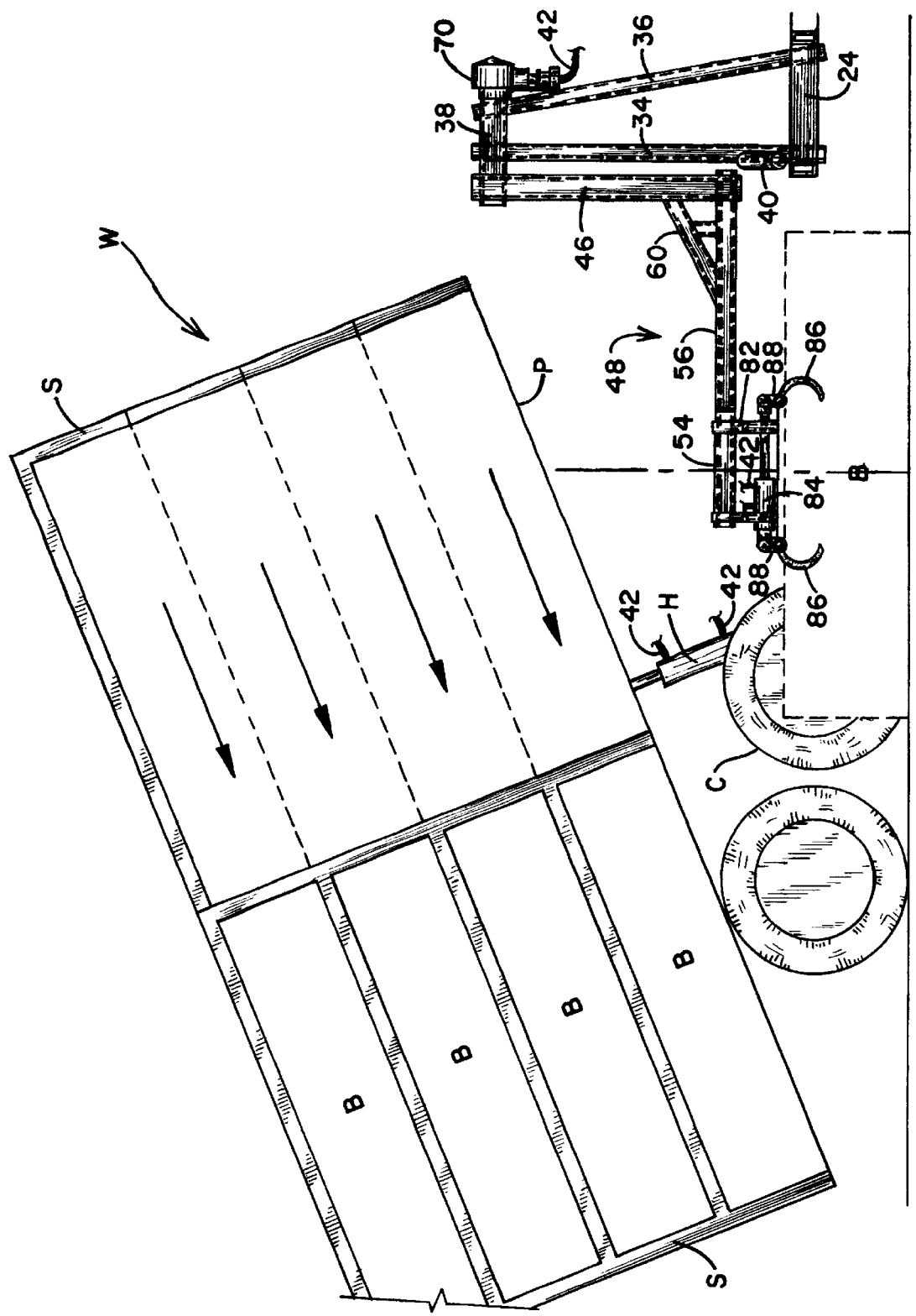
FIG. 5 is a side view of the bale loading assembly with a tilt bed wagon tilted to slide stacked bales to the rear.
Figure 6:
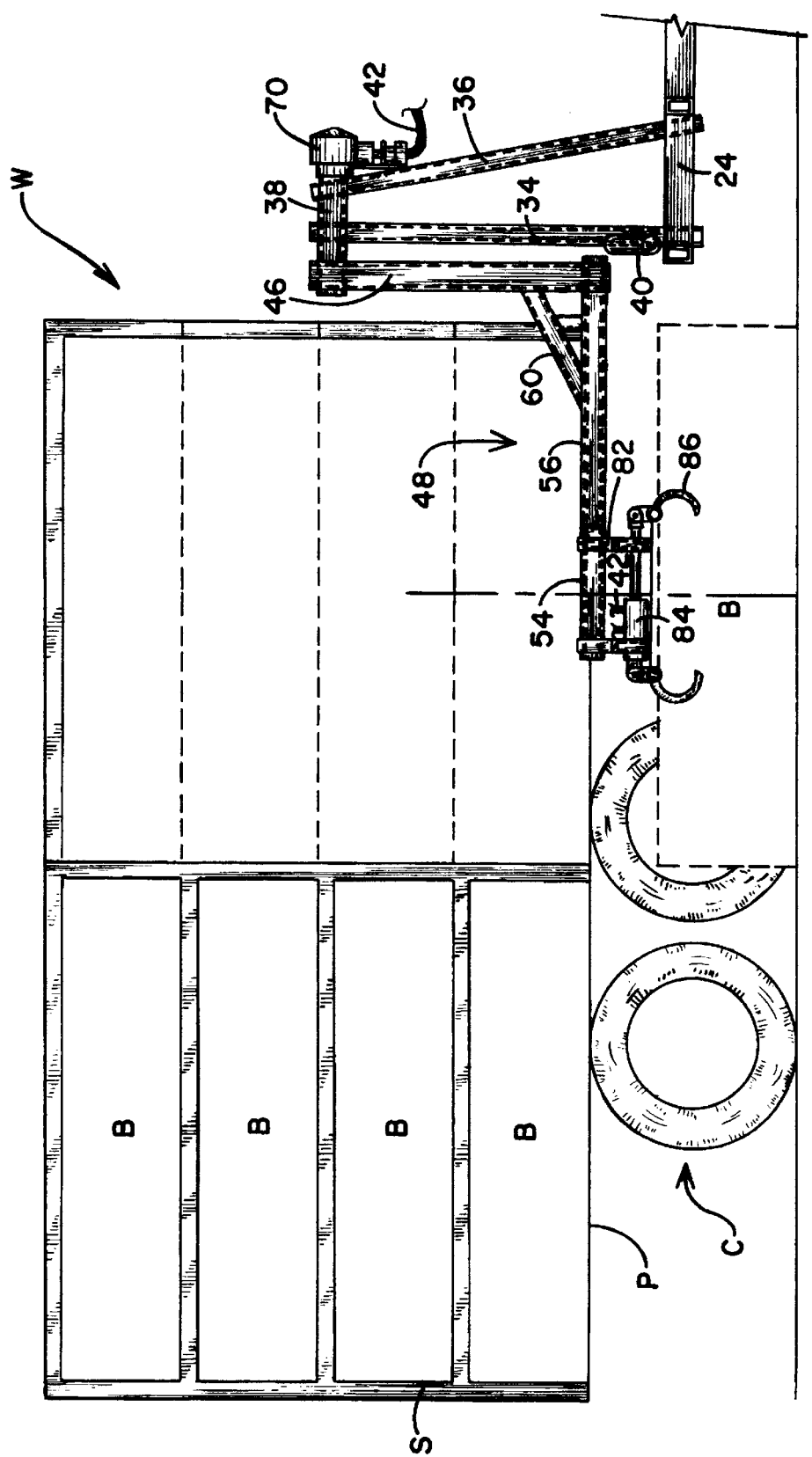
FIG. 6 is a side view of the bale loading assembly with a tilt bed wagon prepared to receive additional bales.

The wagon contains suitable side boards S to hold the bale stacks on the wagon bed. The tilting and sliding of the stacked bales B is shown in FIG. 5. The tilt bed wagon with stacked bales moved to the rear of the wagon is shown in FIG. 6. The wagon bed is now ready to receive additional bales to produce another stack in the front portion of the transport platform P. The hydraulic powered bale loading arm assembly 10 and hydraulic powered tilt bed trailer allow a single individual to collect and transport a large load of bales from one location to another with minimal effort.

The invention also includes a tilt bed wagon member W in combination with a bale loading arm assembly 10 for loading and transporting bales. The tilt bed wagon member W comprises a wheeled chassis C supporting a tiltable bale accumulating transport platform P with side board to members S for retaining bales thereupon. There is provided means for tilting the platform P from a generally horizontal orientation relative to the chassis C to an orientation with a front end of the platform elevated above the chassis. The tilting means is a hydraulic cylinder H positioned between the chassis C and the transport platform P. The tilted platform P is depicted in FIG. 5. A tongue member T fastened to a front end of the chassis C extends forward of the transport platform P for attachment of the tilt bed wagon member W to a powered vehicle, such as a tractor or the like. A bale loading arm assembly 10 for transferring a bale to the bale accumulating transport platform P is the assembly described in detail above. The wagon member W and bale loading arm assembly 10 combination operates as described above, as well.

While the invention has been particularly shown and described with reference to a preferred embodiment thereof, it will be understood by those skilled in the art that various changes in form and details may be made therein without departing from the spirit and scope of the invention.

I claim:

1. A bale loading arm assembly for transferring a bale to a bale accumulating transport platform comprising;
    a) a boom lift assembly mounted forward of said transport platform, said boom assembly having a boom member rotatable in an arc about a horizontal axis;
    b) an L-shaped rotating lift arm assembly rotatably attached by a first leg member to said boom member, said first leg member rotatable in a plane which is oriented parallel to said boom member arc, with a second leg member oriented perpendicular to said boom member and extending rearward adjacent said transport platform;
    c) an adjustable bale clamp assembly adapted engage and release a bale, and which is operatively attached to the second leg of the lift arm assembly extending rearward adjacent said transport platform; and
    d) means for causing said bale clamp assembly to engage and release a bale comprising a hydraulic cylinder secured parallel to said L-shaped arm assembly second leg member, said hydraulic cylinder having bale engaging tine members operatively attached at each end thereof for engaging and releasing a bale;
    e) whereby said transport platform is positioned adjacent a bale, said boom lift assembly and L-shaped lift arm assembly cooperatively rotate away from said transport platform to position said bale clamp assembly to engage a bale, the clamp assembly engages the bale, then said boom lift assembly and L-shaped lift arm assembly cooperatively rotate toward said transport platform to position said bale clamp assembly and engaged bale at a selected position on the transport platform, where the bale clamp assembly releases the positioned bale.

2. The bale loading arm assembly according to claim 1 further comprising means for rotating said boom member about a rotatably secured first end, thereby moving a second end of said boom member in an arc relative thereto.

3. The bale loading arm assembly according to claim 2 wherein said boom member comprises first and second leg members with said leg members separated a greater distance at said boom member secured first end than at said boom member second end.

4. The bale loading arm assembly according to claim 2 wherein said means for rotating said boom member about a rotatably secured first end comprises a hydraulic cylinder member positioned between an anchor section and said boom member.

5. The bale loading arm assembly according to claim 2 further comprising means for selectively rotating said L-shaped lift arm assembly relative to said second end of said boom member, said second leg member moving in an arc relative thereto.

6. The bale loading arm assembly according to claim 5 wherein said means for selectively rotating said L-shaped lift arm assembly relative to said second end of said boom member comprises a connecting shaft member rigidly secured to said first leg member opposite end and rotatably secured to said boom member second end, said connecting shaft member rotated by a worm drive gear box coupler assembly attached thereto.

7. The bale loading arm assembly according to claim 1 wherein said L-shaped arm assembly second leg member comprises an inner leg section extending from an outer leg section, said outer leg section fastened at a right angle apex of said arm assembly with said inner leg section extending in opposition thereto.

8. A bale loading arm assembly for transferring a bale to a bale accumulating transport platform comprising;
  a) a boom lift assembly comprising a boom member with first and second ends, said boom member first end rotatably secured forward of said transport platform, means for rotating said boom member about said secured first end, thereby moving said boom member second end in an arc relative thereto;
  b) an L-shaped rotating lift arm assembly with first and second leg members attached at a right angle apex, each leg member having an end opposite said apex, said first leg member opposite end rotatably attached to said second end of said boom member, said first leg member rotatable in a plane oriented parallel to said boom member arc, said second leg member oriented perpendicular to said boom member and extending rearward adjacent said transport platform, means for selectively rotating said L-shaped lift arm assembly relative to said second end of said boom member, said second leg member moving in an arc relative thereto;
  c) an adjustable bale clamp assembly fastened to said L-shaped arm assembly second leg member opposite end, said assembly including a bale clamp member adapted to reversibly engage a bale, with means for causing said bale clamp to engage and release a bale;
  d) whereby said transport platform is positioned adjacent a bale, said boom lift assembly and L-shaped lift arm assembly cooperatively rotate away from said transport platform to position said bale clamp assembly to engage a bale, the clamp assembly engages the bale, then said boom lift assembly and L-shaped lift arm assembly cooperatively rotate toward said transport platform to position said bale clamp assembly and engaged bale at a selected position on the transport platform, where the bale clamp assembly releases the positioned bale.

9. The bale loading arm assembly according to claim 8 wherein said boom member comprises first and second leg members with said leg members separated a greater distance at said boom member first end than at said boom member second end.

10. The bale loading arm assembly according to claim 8 wherein said means for rotating said boom member about said secured first end comprises a hydraulic cylinder member positioned between an anchor section and said boom member.

11. The bale loading arm assembly according to claim 8 wherein said means for selectively rotating said L-shaped lift arm assembly relative to said second end of said boom member comprises a connecting shaft member rigidly secured to said first leg member opposite end and rotatably secured to said boom member second end, said connecting shaft member rotated by a worm drive gear box coupler assembly attached thereto.

12. The bale loading arm assembly according to claim 8 wherein said L-shaped arm assembly second leg member comprises an inner leg section extending from an outer leg section, said outer leg section fastened at said arm assembly right angle apex with said inner leg section extending in opposition thereto.

13. The bale loading arm assembly according to claim 8 wherein said means for causing said bale clamp assembly to engage and release a bale comprises a hydraulic cylinder secured parallel to said L-shaped arm assembly second leg member inner section, said hydraulic cylinder having bale engaging tine members operatively attached at each end there of for reversibly engaging and releasing a bale.

14. A tilt bed wagon member in combination with a bale loading arm assembly for loading and transporting bales comprising;
  a) a tilt bed wagon member comprising a wheeled chassis supporting a tiltable bale accumulating transport platform, said platform having side board members for retaining bales thereupon, means for tilting said platform from a generally horizontal orientation relative to said chassis to an orientation with a front end of said platform elevated above said chassis, a tongue member fastened to a front end of said chassis and extending forward of said transport platform for attachment of said tilt bed wagon member to a powered vehicle;
  b) a bale loading arm assembly for transferring a bale to said bale accumulating transport platform comprising;
  c) a boom lift assembly mounted forward of said transport platform and upon said tongue member of said tilt bed wagon member, said boom assembly having a boom member rotatable in an arc about a horizontal axis;
  d) an L-shaped rotating lift arm assembly rotatably attached by a first leg member to said boom member, said first leg member rotatable in a plane which is oriented parallel to said boom member arc with a second leg member oriented perpendicular to said boom member and extending rearward adjacent said transport platform;
  e) an adjustable bale clamp assembly adapted to engage and release a bale, and which is operatively attached to the leg of the lift arm assembly extending rearward adjacent said transport platform;

f) whereby said wagon member with bale accumulating transport platform is positioned adjacent a bale, said boom lift assembly and L-shaped lift arm assembly cooperatively rotate away from said wagon member with transport platform to position said bale clamp assembly to engage a bale, the clamp assembly engages the bale, then said boom lift assembly and L-shaped lift arm assembly cooperatively rotate toward said wagon member with transport platform to position said bale clamp assembly and engaged bale at a selected position on the transport platform, where the bale clamp assembly releases the positioned bale.

15. The wagon member and bale loading arm assembly combination according to claim 14 further comprising a hydraulic cylinder member positioned between an anchor section and said boom member for rotating said boom member about a rotatably secured first end, thereby moving a second end of said boom member in an arc relative thereto.

16. The wagon member and bale loading arm assembly combination according to claim 15 wherein said boom member comprises first and second leg members with said leg members separated a greater distance at said boom member secured first end than at said boom member second end.

17. The wagon member and bale loading arm assembly combination according to claim 15 further comprising a connecting shaft member rigidly secured to said L-shaped rotating lift arm assembly first leg member opposite end and rotatably secured to said boom member second end, said connecting shaft member rotated by a worm drive gear box coupler assembly attached thereto for selectively rotating said L-shaped lift arm assembly relative to said second end of said boom member, said second leg member moving in an arc relative thereto.

18. The wagon member and bale loading arm assembly combination according to claim 14 wherein said L-shaped arm assembly second leg member comprises an inner leg section extending from an outer leg section, said outer leg section fastened at a right angle apex of said arm assembly with said inner leg section extending in opposition thereto.

19. The wagon member and bale loading arm assembly combination according to claim 18 further comprising a hydraulic cylinder secured parallel to said L-shaped arm assembly second leg member inner section, said hydraulic cylinder having bale engaging tine members operatively attached at each end thereof for engaging and releasing a bale.

* * * * *